3,147,207
LIQUID-SOLIDS CONTACTING PROCESS AND APPARATUS FOR THE CONVERSION OF HYDROCARBONS
Thomas F. Doumani, Whittier, Calif., assignor to Union Oil Company of California, Los Angeles, Calif., a corporation of California
Filed May 12, 1961, Ser. No. 109,688
9 Claims. (Cl. 208—111)

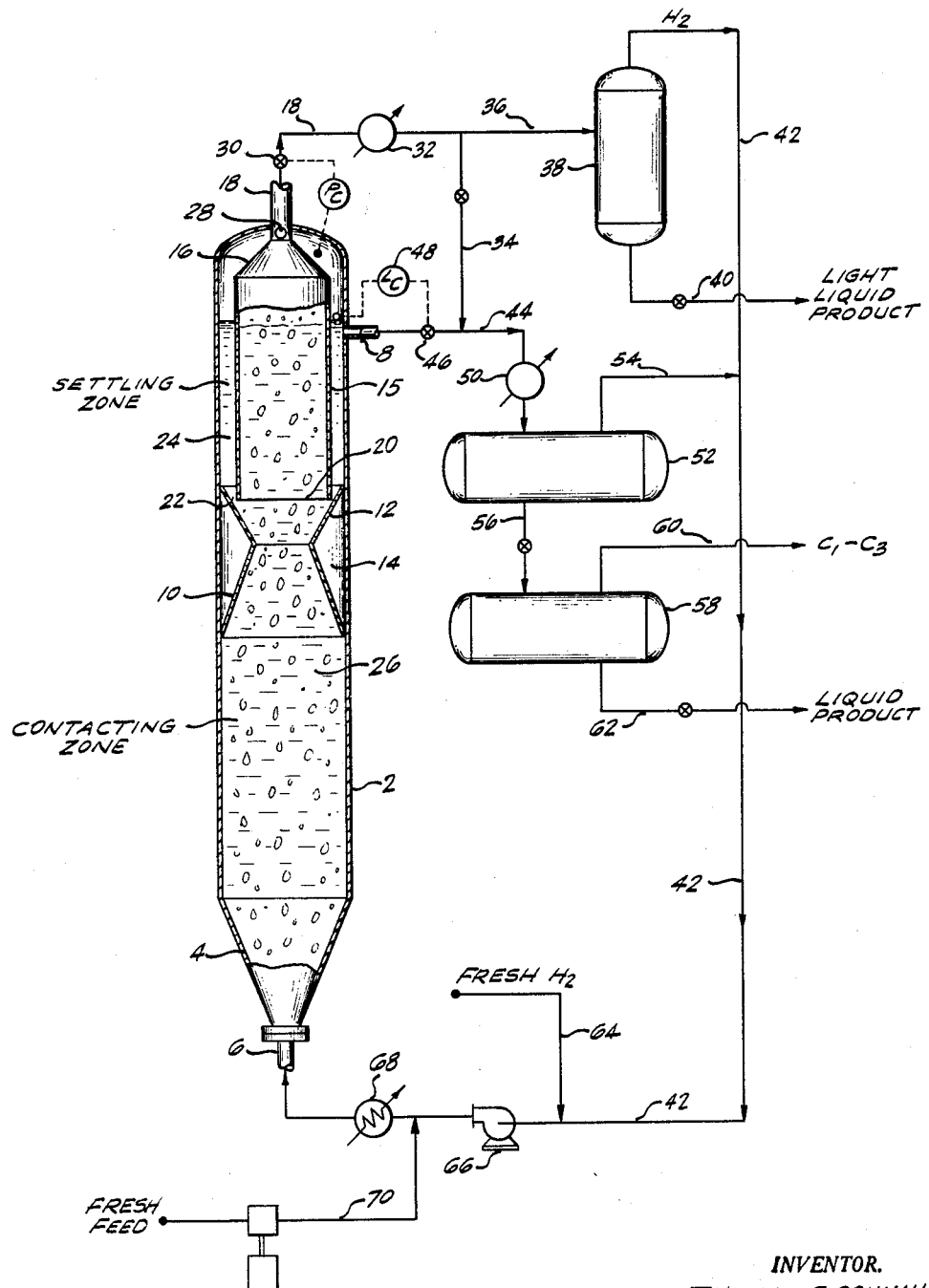

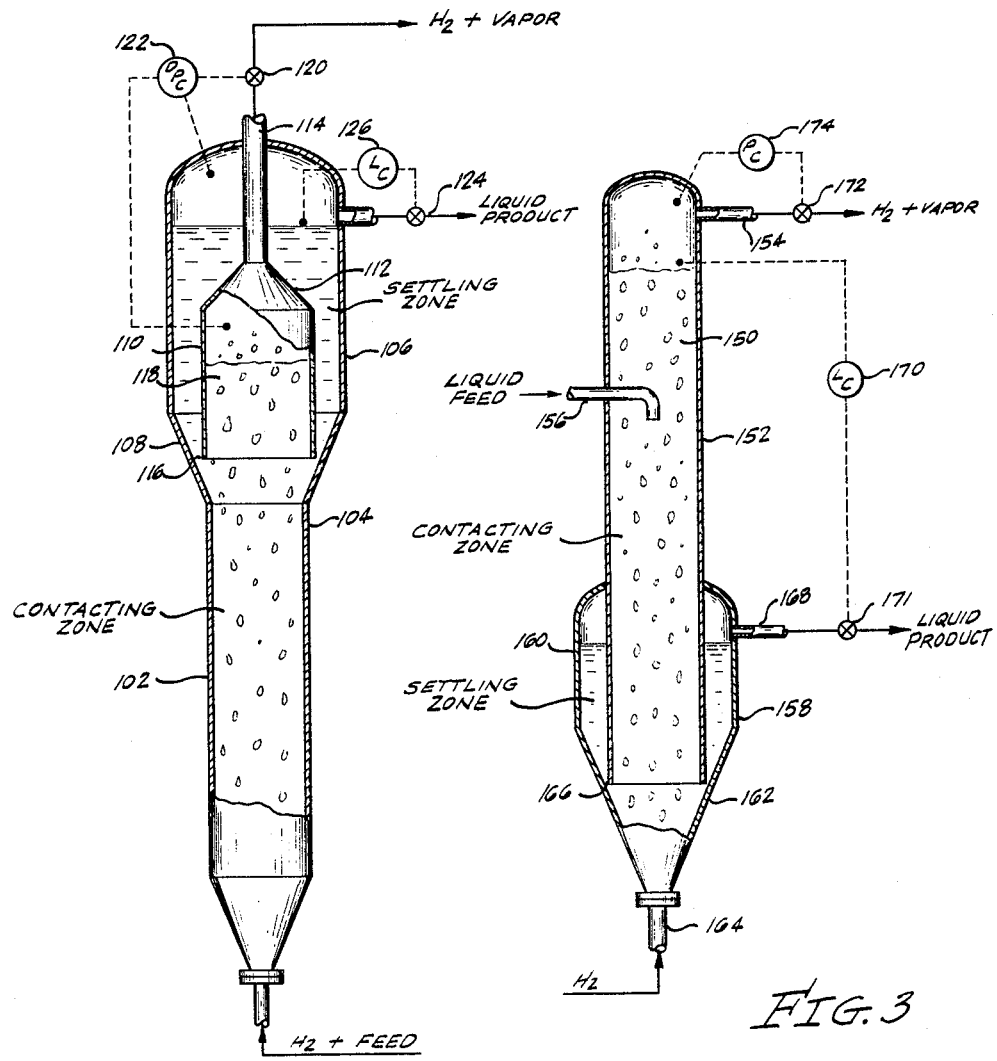

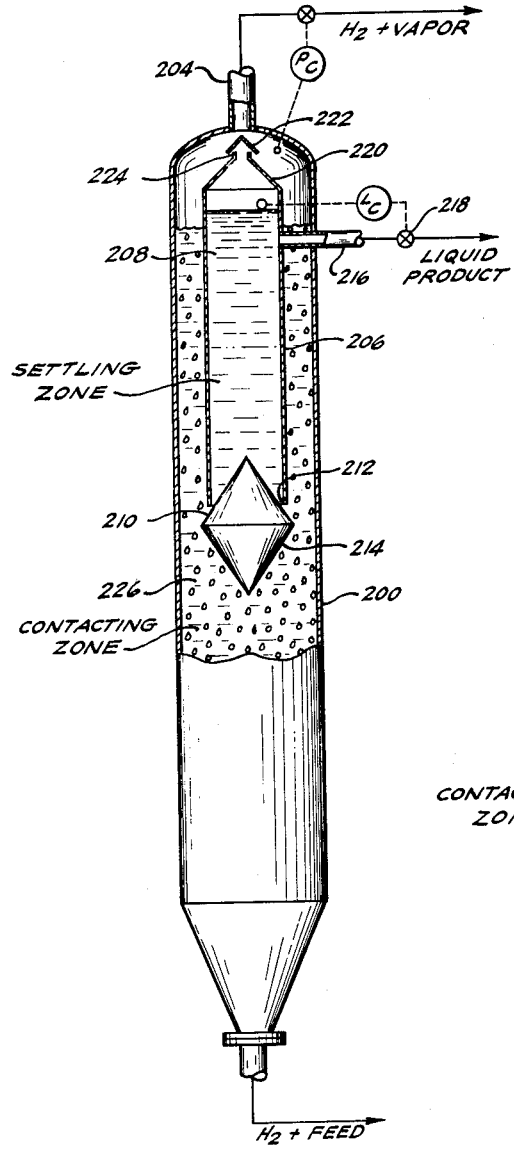
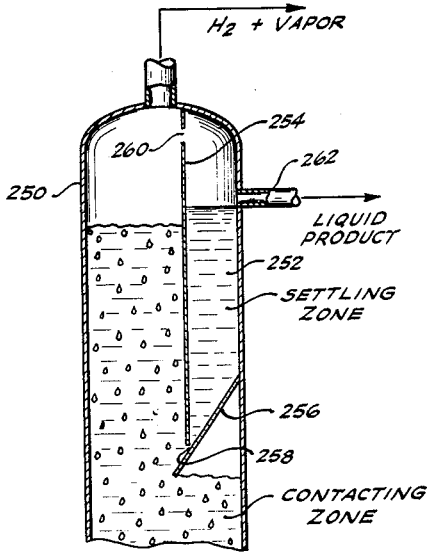
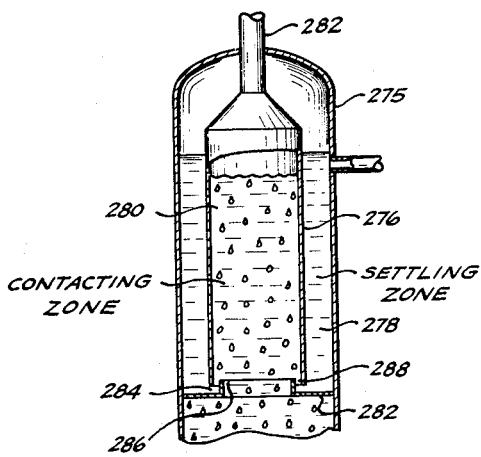

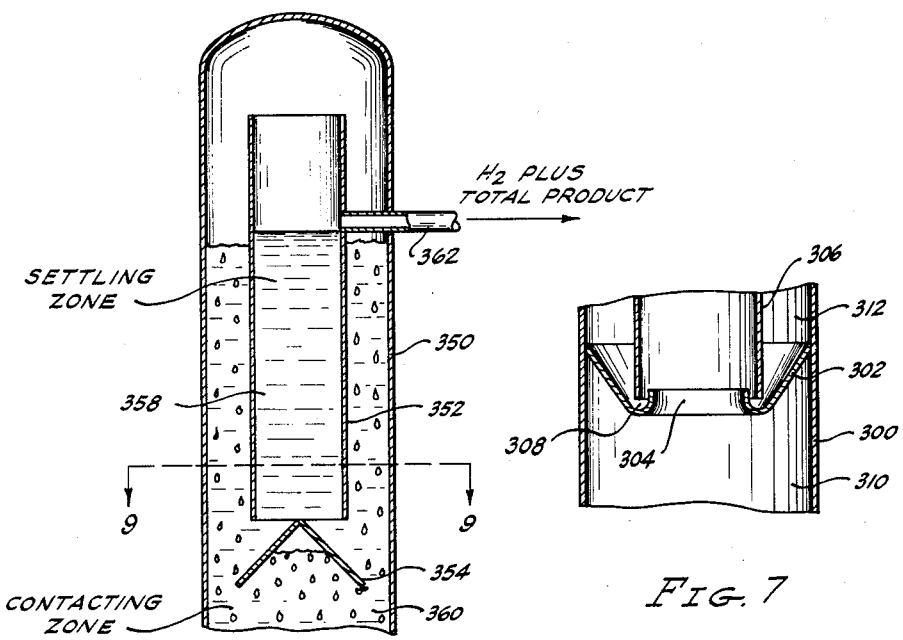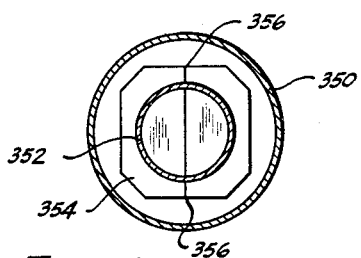

This invention relates in general to improved methods and apparatus for the treatment of liquids with finely divided solids, and is concerned in particular with the catalytic processing of heavy mineral oils in the presence of hydrogen and/or other gases. Specific treatments contemplated include for example hydrogenation, hydrofining, hydrocracking, hydrodealkylation, etc. The basic features of the process and apparatus are however useable in other contacting processes involving for example oxidation, halogenation, condensations, selective adsorption and the like.

In its preferred aspect, the invention contemplates the catalytic treatment of heavy oils with hydrogen under conditions of elevated temperature and pressure, utilizing a catalyst in very finely divided state, which is confined within a contacting zone as a slurry in the feed being treated, while fresh feed is continuously introduced and liquid product is continuously withdrawn. During the treatment, hydrogen is bubbled through the slurry at controlled rates hereinafter prescribed, in order to keep the liquid saturated with dissolved hydrogen and to keep the catalyst in a more or less dispersed state. A particularly advantageous feature of the invention involves an integral separation of liquid product from solid catalyst, whereby substantially all of the catalyst inventory is maintained in the contacting zone and the liquid product withdrawn is almost completely free of catalyst.

Another advantageous feature of the process involves the use of a finely subdivided catalyst of particle diameter less than about 40 microns, and preferably between about 0.01 and 10 microns. It has been found that the use of catalyst particles in this size range presents definite advantages over the use of larger particles. In previously proposed catalytic slurry processing methods, it has generally been considered necessary to use catalyst particles of greater than about 50 microns, at least when processing heavy oils. This has been considered necessary in order to achieve adequate separation of the catalyst from the product. It has now been found however that, even in the treatment of heavy oils, catalyst particles in the 1 micron size range and below can be rapidly separated by gravity settling under processing conditions including temperatures above about 400° F., and hydrogen pressures above about 500 p.s.i.g., assuming the specific gravity of the catalyst particles is greater than about 1.0.

The essential features of the contacting process herein described, as applied to the treatment of heavy oils, comprise: (1) establishing an ebullient three-phase system in a contacting zone, the system comprising the liquid feed, the granular solid, and a discontinuous gas phase (normally hydrogen) bubbling upwardly through said liquid phase at controlled rates hereinafter prescribed so as to keep the liquid saturated and maintain the solids dispersed in the liquid phase, forming a slurry, (2) continuously introducing liquid feed into the system while continuing the bubbling of gas therethrough, (3) continuously withdrawing laterally from the system a stream of slurry free of gas bubbles and transferring the same to a contiguous settling zone maintained at a temperature above about 400° F. and above about 500 p.s.i.g., and allowing catalyst to settle therein, (4) allowing the settled catalyst to flow by gravity back into the three-phase contacting system, and (5) withdrawing catalyst-free liquid from the upper portion of said settling zone. Specific features of the invention include novel and advantageous means and methods for withdrawing the slurry stream from the contacting zone into the settling zone while excluding gas bubbles from the settling zone. Specifically, it has been found that the slurry stream can advantageously be withdrawn as a thin lamelliform stream through a narrow elongated aperture in a confining wall structure, the width of the aperture being controlled so as to exclude the entry of gas bubbles into the settling zone, while the length of the aperture is controlled so as to reduce the linear flow rate of liquid therethrough to a value sufficiently low to permit the countercurrent return of settled catalyst particles by gravity into the contacting zone. In the preferred modification, the width of the slurry withdrawal aperture is less than about ¼ inch, and preferably between about $\frac{1}{1000}$ and ⅛ inch.

In the catalytic treatment of hydrocarbon oils with hydrogen, the most commonly employed technique involves contacting a vapor phase mixture of the feed and hydrogen with macropellets of catalyst in the ⅛ inch to ½ inch size range. Such techniques are quite efficient where the feed is entirely in the vapor phase, since mass transfer rates into the catalyst depend mainly upon gas diffusion rates. As a result, fairly effective use is made of the interior surface area of the catalyst particles. Moreover, the rapid diffusion of hydrogen gas into the pores of the catalyst, tends to minimize the deposition of coke and other deactivating deposits on the active surface areas by rapid hydrogenation of coke precursors. Difficulties are encountered in these macro-catalyst contacting processes however when it is attempted to treat high-boiling feedstocks which exist at least partly in the liquid phase during the contacting. In such processes, the interior surface areas of the catalyst particles become relatively useless due to the liquid barrier in and surrounding the catalyst particles. As a result, only a small portion of the active surface area is effectively utilized, and moreover the rate of deactivation is accelerated due to the adsorption of heavy coke-forming materials on interior catalyst surfaces where the supply of hydrogen is deficient due to the low diffusion rates through the liquid barrier.

To avoid the above-noted difficulties in processing heavy oils, several techniques have been suggested for liquid phase processing with the catalyst in rather finely divided form, utilizing slurry techniques. Previous attempts to utilize these techniques however have not been entirely successful. Some methods involve the pumping of the feed-catalyst slurry from the contacting zone to a settling zone, and the return of settled catalyst to the contacting zone. The circulation of catalyst slurries through pumps is undesirable due to the abrading action of the catalyst upon the pump mechanism, and also because plugging problems frequently develop when attempting to handle thick slurries. Moreover, the continuous circulation of catalyst through pump mechanisms tends to reduce the particle size to a point where adequate separation of catalyst from the liquid product is difficult. To avoid these difficulties, other techniques have been proposed (as in U.S. Patent No. 2,944,961), wherein the catalyst particles are maintained in the contacting zone by continuous gravity return from a contiguous settling zone. However, in these processes it has generally been considered necessary to utilize catalysts of at least about 50 microns in diameter, to obtain adequate settling. It has now been found that contacting processes of this type are much improved if the catalyst size is reduced to below about 40 microns, and rapid settling can be obtained by completely excluding gas bubbles from the contiguous settling zone.

In view of the foregoing, it is the overall objective of this invention to improve the efficiency of catalyst utilization, and to decrease the rate of catalyst deactivation, in liquid phase, slurry contacting processes. A more specific object is to provide novel methods and apparatus for withdrawing catalyst-free liquid from an ebullient three-phase system comprising finely divided catalyst, liquid feed, and a bubbling gas phase. Other objects will be more apparent from the detailed description which follows.

The invention can perhaps be best understood with reference to the attached drawings.

FIGURE 1 shows in cross-section a suitable modification of the contacting and product-separation apparatus for use herein, and also illustrates schematically suitable associated product recovery means, hydrogen recycle means, and feed supply means.

FIGURE 2 is a vertical cross-sectional illustration of a slightly modified version of the apparatus shown in FIGURE 1, wherein different liquid levels are maintained in the reaction zone and the settling zone.

FIGURE 3 shows in vertical cross-section, a modification of the apparatus which permits substantially countercurrent flow of hydrogen and liquid feed.

FIGURE 4 illustrates in vertical cross-section, a modification of the apparatus wherein the settling zone is located axially, rather than peripherally as in FIGURE 1.

FIGURE 5 illustrates in vertical cross-section another modification of the invention in its simplest form, wherein the settling zone is simply a side compartment of the reaction zone.

FIGURE 6 illustrates in vertical cross-section, a modification of the FIGURE 1 apparatus, utilizing a more positive bubble seal between the settling zone and the contacting zone.

FIGURE 7 illustrates in vertical cross-section, a preferred modification of the bubble-seal apparatus of FIGURE 6.

FIGURE 8 illustrates in vertical cross-section, a modification of the central portion of the apparatus of FIGURE 4, showing a different form of bubble baffle.

FIGURE 9 is a horizontal cross-section taken along line 9—9 of FIGURE 8.

Referring now more particularly to FIGURE 1, the principal piece of apparatus consists of an elongated outer cylindrical, pressure-retaining shell 2, which is constructed of iron, steel, or other metal according to substantially conventional design. Preferably, the shell 2 terminates at its lower end in a frusto-conical bottom portion 4, the lower end of which communicates with gas and feed inlet conduit 6. Near the upper end of outer shell 2, is provided a liquid product outlet conduit 8, which is positioned somewhat below the liquid level to be maintained in the settling zone.

Supported coaxially within outer shell 2, and at an intermediate level therein, is a frusto-conical bubble deflector 10, which serves to deflect bubbles inwardly in the contacting zone, away from the peripheral slurry withdrawal aperture 22 to be described hereinafter. Positioned immediately above bubble deflector 10, and preferably joined thereto by a continuous, liquid-tight weldment, is positioned an inverted frusto-conical baffle member 12, which acts as a solids distributor for returning solids from the settling zone. It will be understood that bubble deflector 10 and baffle 12 are supported within outer shell 2 by weldments, flanges, bolts, or any suitable attaching means, not shown. These elements need not be constructed of pressure-retaining materials, if the annular space 14 surrounding them is vented to reactor pressure.

Supported coaxially above baffle member 12 is a cylindrical inner baffle 15, open at its lower end, and communicating at its upper end via frusto-conical shroud 16, with vapor outlet conduit 18. Cylindrical baffle 15 is supported within outer shell 2 by flanges, brackets, or the like, not shown, or it may be supported at its lower end by suitable brackets or flanges to baffle member 12. Regardless of the means employed for supporting the inner baffle 15, it must be positioned so that its lower edge 20 is spaced slightly above the inner surface of baffle 12 in such manner as to provide an annular aperture 22 of the width prescribed herein, to permit the simultaneous countercurrent withdrawal of liquid slurry into settling zone 24, and the return of solids from zone 24 into the central contacting zone 26.

The apparatus here illustrated is designed to operate with settling zone 24 at the same pressure as contacting zone 26. To equalize pressures, one or more vents 28 are provided in the lower portion of vapor outlet conduit 18. By virtue of maintaining equal pressures in both zones, it will be understood that cylindrical baffle 15 and shroud 16 need not be constructed of pressure-retaining materials. The function of shroud 16 is to prevent the splashing over into settling zone 24 of ebullient catalyst slurry which is maintained in contacting zone 26.

A suitable mode of operating the apparatus of FIGURE 1 is as follows: First, the desired charge of powdered catalyst, or other solids, is introduced into contacting zone 26 as for example through vapor outlet conduit 18. The amount of catalyst to be employed can vary widely, depending upon the type of operation to be performed. It is contemplated that from about 1% to 60%, but ordinarily from about 5% to 40%, of the total volume of the contacting zone will be occupied by catalyst at its static gross bulk. The more catalyst employed, the thicker will be the slurry in contacting zone 26, and concomitantly, the greater will be the permissible feed throughput rate.

With the catalyst charge in place, preheated feed and hydrogen are introduced into feed inlet conduit 6 and thence into the bottom of the reactor. An ebullient slurry is thus formed within the contacting zone, and hydrogen plus vaporized feed components are continuously withdrawn via vapor outlet conduit 18, controlled by back-pressure-regulated valve 30. The gaseous effluent in line 18 is cooled in condenser 32, and may then be transferred, either via line 34 to the liquid product recovery system to be hereinafter described, or it may be diverted via line 36 to gas-liquid separator 38 for separate recovery of the light liquid product via line 40. Hydrogen recycle gas is removed from separator 38 via line 42 and recycled, as will be subsequently described.

With the continuous introduction of feed into contacting zone 26, the liquid level gradually builds up and enters the zone defined by cyclindrical inner baffle 15. When this occurs, liquid slurry flows through aperture 22 into settling zone 24, in which the liquid level also continues to rise until a predetermined level is reached.

As indicated above, a critical aspect of the invention involves controlling the gas throughput rate in contacting zone 26, and adjusting the width of aperture 22, so that substantially no gas bubbles whatever will enter settling zone 24. Due to the very finely divided nature of the catalyst, it has been found that adequate dispersal thereof in contacting zone 26 can be maintained at gas throughput rates sufficiently low to avoid any appreciable "packing" effect of bubbles in the area of aperture 22. When there is a packing effect of the bubbles, there will be undesirable local splashing and turbulence of liquid, and the normal upward flow of bubbles is disrupted. Under such conditions, bubbles can be forced sideways to impinge upon aperture 22 with sufficient kinetic energy to be in part forced therethrough. The result is that even though aperture 22 be very narrow, high gas throughput rates can cause the forcing of small bubbles through aperture 22, with resultant hindering of catalyst settling in settling zone 24.

It has been found however that when the gas flow rate is maintained at a value below about 20, and preferably below 10, cubic feet per minute per square foot of cross-sectional area at the level of aperture 22, and especially when aperture 22 is less than about ¼ inch in width, substantially no bubbles will escape into settling zone 24. The result is that a very efficient settling of catalyst takes place, and even though the linear flow rate of liquid through aperture 22 be greater than the settling velocity of the solids, the settled solids will return by gravity countercurrently to the withdrawn slurry stream. Normally, a rather definite catalyst interface can be observed in settling zone 24, which interface is only a few inches or less above aperture 22. It is preferable in some cases to narrow the width of aperture 22 so as to maintain a slight "head" of settled catalyst in settling zone 24, since this is found to assist in excluding gas bubbles from settling zone 24.

The foregoing is not meant to indicate that there is a maximum gas flow rate which is the same for all apparatus designs. Obviously the width of aperture 22 is a related variable, as is the type of shielding or baffles provided to mechanically deflect bubbles therefrom. But, for each particular apparatus design shown herein, there will be a maximum permissible gas flow rate which is above the minimum value required to maintain adequate distribution of catalyst of the particle sizes and densities herein prescribed. It may be said that the maintenance of a minimum slurry-withdrawal aperture width always provides for greater flexibility in permissible gas flow rates and catalyst particle sizes, within the broad ranges herein prescribed. In general, the minimum gas flow rates required to maintain adequate catalyst distribution (the distribution need not be absolutely homogeneous) in the contacting zone will vary between about 0.05 and 1 cubic foot per minute per square foot of reactor cross-section, for catalyst particle sizes between about 0.1 and 40 microns and assuming a specific gravity of about 1 to 4 for the catalyst particles and below about 0.8 for the liquid feed (under process conditions).

Referring again to FIGURE 1, liquid product from settling zone 24 is withdrawn via outlet conduit 8, valve 46 and line 44 in response to liquid level controller 48. The withdrawn liquid in line 44 is then passed through cooler 50 and transferred to high-pressure separator 52, from which hydrogen recycle gas is withdrawn via line 54 and blended with the recycle hydrogen in line 44. Liquid product in separator 52 is withdrawn via line 56 and flashed into low-pressure separator 58, from which light hydrocarbon gases, H₂S, etc., are withdrawn overhead via line 60, and liquid product is withdrawn via line 62 and sent to product fractionation equipment not shown. Recycle hydrogen in line 42 is then blended with fresh makeup hydrogen from line 64, and the mixture is then returned to the reactor via compressor 66, preheater 68 and inlet conduit 6. Fresh liquid feed is normally introduced via line 70, immediately ahead of preheater 68.

FIGURE 2 illustrates a slightly modified version of the contacting and product-separation apparatus illustrated in FIGURE 1. Unless otherwise indicated, the structural details of FIGURE 2, and the succeeding figures, are similar to those described in connection with FIGURE 1. The principal piece of apparatus is an elongated column 102, which is divided into a lower contacting section 104 and an upper settling chamber 106 which is larger in diameter than lower section 104. A frusto-conical connecting member 108 is provided between section 104 and chamber 106, which also serves internally as a solids distribution baffle similarly to baffle 12 of FIGURE 1. Supported coaxially within settling chamber 106 is a cylindrical inner baffle 110, open at its lower end, and communicating at its upper end via frusto-conical shroud 112 with vapor outlet conduit 114. Cylindrical baffle 110 is positioned so that its lower edge is spaced slightly above the inner surface of connecting member 108, so as to provide an annular aperture 116 of the desired width.

The apparatus of FIGURE 2 is designed to operate so as to maintain a higher liquid level in settling chamber 106 than in contacting zone 118. To achieve this objective, back-pressure-regulated valve 120 in vapor outlet conduit 114 is controlled by differential pressure controller 122, which in turn is set to maintain the necessary pressure differential between the vapor spaces above the liquid in settling chamber 106 and contacting zone 118. This differential pressure will, of course, correspond to the difference in liquid head between the two zones. The purpose in maintaining different liquid levels in the settling zone and contacting zone is to maintain an adequate liquid height in the settling zone to permit complete settling of catalyst, but at the same time to avoid unnecessary "pocketing" of treated feedstock in the upper portion of the contacting zone above slurry outlet aperture 116. The overall effect is to provide a more direct "plug" flow of liquid feed from the inlet to the outlet of the contacting zone. But this is not always required, since in many cases it is permissible, or even desirable, to allow the feed to continue reacting until most of it is vaporized. This is particularly the case in hydrocracking operations.

Liquid product in settling chamber 106 is withdrawn via outlet line 124 in response to liquid level controller 126, as in FIGURE 1. The subsequent treatment of product and recycle gases may be the same as shown in FIGURE 1.

Referring now to FIGURE 3, this modification of the apparatus is designed to permit an overall reduction in height, and also to permit substantially countercurrent flow of hydrogen and liquid feed. The contacting zone 150 is defined by an elongated cylindrical column 152, open at its lower end, and equipped with a vapor outlet conduit 154 near the top thereof, and a liquid feed inlet conduit 156 at an intermediate level somewhat below the liquid level to be maintained therein. The feed is introduced below the liquid level in order to avoid the flashing off into product vapor of the lighter portions of feed, before adequate contacting with catalyst and hydrogen. The general flow of liquid is downward.

Surrounding the lower end of contacting column 152 is a settling chamber 158, which is divided into an upper closed cylindrical section 160, and a lower frusto-conical bottom section 162, which communicates with gas inlet conduit 164. Column 152 is supported within settling chamber 158 so as to space the lower edge thereof slightly above the inner surface of frusto-conical section 162, thereby providing the desired slurry withdrawal aperture 166. A liquid product outlet conduit 168 is provided near the top of settling chamber 158.

Due to the different liquid levels maintained in settling chamber 158 and contacting column 152, it is apparent that differential pressures will prevail therein. In this instance, however, the control of liquid product withdrawal from settling chamber 158 is made directly responsive to the liquid level in column 152, by means of liquid level controller 170 operating valve 171. In this modification, the product withdrawn via line 168 may comprise both liquid and gaseous materials in whatever ratios they may accumulate in the settling vessel, and either or both is withdrawn as is required to maintain the liquid level in column 152. Recycle gas and vaporized product is withdrawn as previously described via line 154 and valve 172, controlled by back pressure regulator-controller 174.

Referring now to FIGURE 4, the principal piece of apparatus comprises an elongated cylindrical contacting column 200, constructed similarly to column 2 of FIGURE 1. A liquid feed and gas inlet conduit 202 is provided at the bottom, and a valved, pressure-controlled vapor outlet conduit 204 is provided at the top. Supported within the upper section of column 200 by means of flanges or brackets not shown, is a cylindrical inner baffle 206, open at its lower end, defining an axially located settling zone 208. The bottom of cylindrical baffle 206 is partially closed by a solids distributing cone 210, the base of which is somewhat larger in diameter than the diameter of cylindrical baffle 206. Cone 210 is inserted just far enough into cylindrical baffle 206 to provide an annular slurry withdrawal aperture 212 of the desired width.

Depending from solids distributing cone 210, and suitably affixed thereto as by means of a continuous fluid-tight weldment, is an inverted bubble-deflector cone of the same base diameter. It will thus be seen that cones 210 and 214 provide a unitary structure, which may be suitably supported within contacting column 200 by means of a spider structure not shown, or by means of suitable flanges, bolts, or the like from the bottom of cylindrical baffle 206. Near the top of cylindrical baffle 206 is provided a peripheral liquid product withdrawal conduit 216 which traverses the wall of column 200, and in which is positioned a liquid level controlled valve 218. The top of cylindrical baffle 206 is partially closed by means of an open frusto-conical shoulder member 220, the open upper end of which is loosely covered by means of cap 222, thereby providing a vapor communication port 224 to equalize pressures in the vapor spaces at the top of settling zone 208 and contacting zone 226 respectively.

The apparatus of FIGURE 4 functions in a manner substantially similar to that previously described in connection with FIGURE 1, with the exception of course that the upper portion of the contacting zone surrounds the axially located settling zone instead of vice versa. The function of shoulder member 220 and cap 222 is to prevent the splashing over into settling zone 208 of catalyst slurry from contacting zone 226.

FIGURE 5 illustrates a particularly simple and economical form of the apparatus. The outer cylindrical contacting column 250 is similar to those previously described, as may be the various feed inlet and product withdrawal mechanisms. The settling zone 252 is formed in the upper portion of column 250 by means of a flat vertical baffle 254 having a straight bottom edge, and being affixed, as by continuous weldment, to opposite walls of column 250. The lower extremity of settling zone 252 is defined by a sloping, flat solids-return baffle 256 cut in the shape of a conical section and welded to the inner walls of column 250. The lower edge of baffle 254 terminates a sufficient distance above the upper surface of baffle 256 to provide a straight horizontal aperture 258 of the desired width. One or more vapor communication ports 260 is provided in the upper section of baffle 254 in order to equalize pressures. Liquid product is withdrawn from settling zone 252 by means of outlet conduit 262 communicating therewith.

Referring now to FIGURE 6, this apparatus is constructed similarly to that of FIGURE 1, except for the provision of a somewhat more positive bubble seal between the contacting zone and the settling zone. Again there is provided an outer cylindrical column 275 and an inner cylindrical baffle 276, defining an outer annular settling zone 278 and an inner contacting zone 280, with a vapor outlet conduit 282 communicating with contacting zone 280. Supported from the outer walls of column 275, and extending inwardly a short distance beyond the walls of inner cylindrical baffle 276, is a flat ring member 282, forming the floor of settling zone 278. Ring member 282 is positioned sufficiently below the lower extremity of inner baffle 276, to provide an annular slurry withdrawal aperture 284 of the desired width.

Affixed to the inner circumference of ring member 282 is an upright cylindrical lip 286, which extends upwardly a short distance above the lower edge of inner baffle 276. It will be seen that lip 286 provides a more positive bubble seal between settling zone 278 and contacting zone 280, since bubbles would have to pass downwardly through annular space 288 in order to reach the settling zone. This form of the apparatus is peculiarly adapted to operations employing very finely divided solids, in that solids in the 0.01 to 40 micron size range behave much as a liquid, and will flow freely under their own hydrostatic pressure head. The result is that, notwithstanding the absence of a sloping catalyst return member, settled catalyst in the bottom of settling zone 278 will generate a pressure head sufficient to push catalyst back around the lower edge of baffle 276 and over the top of lip 286 into contacting zone 280. This form of operation is generally not feasible when employing catalyst particles of average size above about 40 microns, for such particles generally do not flow freely over each other.

Reference is now made to FIGURE 7, which illustrates a modified version of the slurry withdrawal and catalyst return apparatus of FIGURE 6. Supported within outer cylindrical column 300, is an inverted, hollow, frusto-conical baffle member 302, the inner terminus of which is curved upwardly to provide an inner cylindrical lip 304, the upper edge of which is spaced slightly above the lower edge of inner cylindrical baffle member 306. Upturned lip 304 thus provides a hemi-toroidal channel 308, the bottom of which is spaced a slight distance below the lower edge of cylindrical baffle 306, to provide the desired annular slurry withdrawal aperture. The advantage of the apparatus of FIGURE 7 over that of FIGURE 6 lies in eliminating dead spaces in which catalyst might accumulate and eventually become agglomerated by coke-forming materials. Also, the smoothly curved catalyst-return surfaces defined by baffle 302, toroidal channel 308 and lip 304, facilitate the return flow of catalyst into contacting zone 310 from settling zone 312.

FIGURES 8 and 9 illustrate a modification of the apparatus in which a narrow slurry withdrawal aperture is not required. The successful use of this apparatus in catalytic processing demonstrates that the critical relationships between catalyst particle size and gas flow rates are such that adequate separation of catalyst from liquid can be obtained herein without the preferred limitations in respect to the size of the slurry withdrawal aperture. It is to be noted however that in using apparatus of this type, control of gas flow rates and particle size is more critical than in the case of the other apparatus illustrated herein.

In FIGURES 8 and 9, the principal apparatus comprises an outer cylindrical shell 350 and a concentric inner cylindrical baffle 352, which is open at its lower end. Immediately below cylindrical baffle 352 is positioned a V-shaped baffle member 354, the apex of which is welded diametrically to the lower terminus of cylindrical baffle 352. Baffle 354 functions merely as a bubble deflector to exclude bubbles from internal settling zone 358. Bubbles rising in contacting zone 360 are mostly channeled by the concave under-surface of baffle 354 into two streams rising from the opposite extremities 356 of the apex of the baffle. These bubbles of course are discharged from beneath apex 354 at a level such that they cannot enter the open end of baffle 352. The remaining bubbles, which are not caught beneath baffle 354, are deflected around the periphery thereof, which is spaced considerably outwardly from the perimeter of cylindrical baffle 352, thus effectively excluding them also from settling zone 358. The total liquid and vapor phase product is removed via outlet conduit 362. As indicated, this apparatus functions well at minimal gas flow rates, but is not the preferred form of apparatus where maximum flexibility, or high gas flow rates are desired.

The foregoing description of apparatus for use herein is not intended to be exhaustive; obviously many variations of such apparatus may be constructed which will achieve the same essential ends. One variation in particular which is contemplated involves a modification in the various contacting zones, to provide for minimizing the back flow of liquid with resultant mingling of fresh feed with liquid which has already been sufficiently treated. To overcome this problem, it is contemplated that all or a portion of the contacting zone may be filled with packing material such as Alundum balls, glass beads, marble chips, or similar packing material to provide tortuous passageways of smaller cross-sectional area so as to permit more efficient "plug" flow of liquid upwardly. Alternatively, vertical tube bundles may be placed in the contacting zone. Any of these alternatives will permit more efficient stage-wise contacting within the contacting zone.

Stage-wise operation may also be obtained by placing two or more of the apparatus units in series with the liquid product from one stage being the feed to the next.

While the apparatus described above may be used to carry out a great variety of chemical and/or physical treatments of liquid feedstocks, it is designed primarily to effect reactions commonly referred to as hydrofining and/or hydrocracking. Suitable feedstocks for these operations comprise gas oils, kerosene, jet fuels, fuel oils, cycle oils from other cracking operations, crude oils, crude oil residua, etc. It is preferred to employ feedstocks containing a substantial proportion of materials boiling above about 500° F., and even above 700° F. Hydrogenating catalysts for use in these treatments comprise in general the transitional metals, and specifically titanium, vanadium, chromium, manganese, iron, cobalt, nickel, copper, zinc, zirconium, molybdenum, ruthenium, rhodium, palladium, cadmium, tantalum, tungsten, iridium, platinum, etc. These metals may be employed in free form, or in the form of oxides, sulfides, sulfates, or other compounds. It is found in most cases that the sulfide form of the metal is preferred over the oxide form. The metals or their compounds may be employed singly, or in admixture with one or more other metal components. A preferred class of metals comprises the group VIB and VIII members, and particularly combinations of one or more Group VIB metal with one or more Group VIII metal.

The active hydrogenating component may be employed in substantially undiluted form, but may also be distended upon an adsorbent carrier in proportions ranging, e.g., between about 0.5% and 50% by weight. Suitable carriers include in general the difficultly reducible adsorbent inorganic oxides, for example silica gel, alumina gel, mixtures of silica and alumina, zirconia, titania, magnesia, beryllia, etc. Various natural clays may also be employed after suitable activation by heat and/or acid treatment. Such clays include for example the various montmorillonite clays, e.g., bentonite.

The operation generally referred to as hydrofining is carried out to effect desulfurization, denitrogenation, deoxygenation, color improvement, or merely to effect hydrogenation of gum-forming olefins. Hydrofining is generally carried out at temperatures between about 500° F. and 850° F., and pressures between about 50 and 5,000 p.s.i.g. Liquid hourly space velocities (based upon the actual volume of catalyst used at its static bulk density) may vary between about 0.2 and 50 volumes of liquid feed per volume of catalyst per hour. Preferred catalysts for hydrofining include particularly the combination of Group VIB metal oxides or sulfides with a Group VIII metal oxide or sulfide. Particularly desirable catalysts comprise cobalt sulfide plus molybdenum sulfide, or tungsten sulfide plus nickel sulfide, which may if desired be supported on alumina or silica-stabilized alumina.

Hydrocracking operations may be carried out within the same general range of temperature and pressure conditions as prescribed for hydrofining, although pressures above about 500 p.s.i.g. are generally preferred. Similar space velocities may also be utilized. The upper temperature and pressure ranges generally tend to favor hydrocracking of hydrocarbons, but usually it is preferred to obtain hydrocracking by altering the catalyst so as to provide an acidic cracking component therein. Where an acidic catalyst is used, temperatures as low as about 400° F. may sometimes be used. Hydrocracking catalysts generally comprise a hydrogenating metal, oxide or sulfide (preferably a sulfide) as described above in connection with hydrofining, but the hydrogenating component is generally supported upon a more or less acidic cracking base. Suitable cracking bases include for example composites of silica-alumina, silica-magnesia, silica-zirconia, silica-zirconia-titania, and the like. These cracking bases are preferably impregnated with between about 1% and 30% by weight of hydrogenating component. The metals nickel, cobalt, platinum, rhodium and palladium, or the sulfides thereof are preferred hydrogenating components for hydrocracking catalysts. Certain zeolitic molecular sieves may also be employed as hydrocracking catalyst bases.

The preferred cracking bases comprise composites of silica and alumina containing about 50%–90% silica; coprecipitated composites of silica, titania and zirconia containing between 5% and 75% of each component; decationized, zeolitic, crystalline molecular sieves of the "Y" crystal type, having relatively uniform pore diameters of about 9 to 10 Angstroms, and consisting substantially exclusively of silica and alumina in mole-ratios between about 4:1 and 6:1. Any of these cracking bases may be further promoted by the addition of small amounts, e.g., 1 to 10% by weight, of halides such as fluorine, boron trifluoride, silicon tetrafluoride, etc.

In the liquid phase treatments of this invention, hydrogen rates are determined from a chemical standpoint merely by the amount required to maintain pressure, and thus to maintain the liquid phase substantially saturated with hydrogen at reactor pressure. These chemical requirements usually lie within the range of about 200 to 2,000 s.c.f. per barrel of liquid feed. However, in addition to the chemical requirements, a sufficient excess amount must be supplied to obtain the desired mechanical agitation to keep the catalyst suitably dispersed. As noted, this excess is generally at least about 0.05 to 1 cubic foot per minute per square foot of reactor cross-section measured, measured under reaction conditions. It may be found in some cases, as where the chemical consumption of hydrogen is high, that incremental injection of hydrogen at various levels in the reactor will be desirable in order to maintain the limited excess required for agitation throughout the contacting zone. A substantially homogeneous dispersal of catalyst is normally desirable in the contacting zone, but is by no means necessary.

After long periods of use, the catalysts employed herein will decline in activity due to the deposition of deactivating deposits. When this occurs, regeneration is normally carried out by controlled combustion of the dried catalyst in a separate vessel at e.g., 800–1,500° F., using dilute oxygen-containing gases. If desired, the fluidized technique may be employed.

The following examples are cited to illustrate certain aspects of the invention, but are not intended to be limiting in scope.

*Example I*

A bench scale catalytic conversion apparatus was constructed similar to that illustrated in FIGURES 8 and 9, the critical dimensions of which were as follows:

| | |
|---|---|
| Length of settling zone _____ inches__ | 13.5 |
| Length of contacting zone _____ do____ | 22 |
| Diameter of settling zone _____ do____ | 1.5 |
| Diameter of contacting zone _____ do____ | 2.9 |
| Included angle of V-baffle 354 _____ | 66° |
| Width of V-baffle 354 across apex _____ inches__ | 2 |

A series of hydrofining-hydrocracking runs were carried out in this apparatus, utilizing gas the catalyst a composition originally comprising about 3% cobalt oxide and 15% molybdenum oxide supported on an activated synthetic alumina stabilized with about 5% of coprecipitated silica. The catalyst was ground to a fine powder, the particles of which were predominantly in the 0.5–10 micron diameter range. Since only about 7 grams of this catalyst was used in the reactor, and the feed rate was 400 ml. per hour, the equivalent space velocity was greater than about 50 volumes of liquid feed per hour per volume of dry catalyst. Hydrogen was supplied at the bottom of the reactor at the rate of 6.2 s.c.f. per hour, corresponding to about 2,500 s.c.f. per barrel of feed. The reactor pressure was 600 p.s.i.g., and the feed was a coker distillate derived from a Santa Maria, California crude oil, having the following characteristics:

| | |
|---|---|
| Gravity, ° API | 26 |
| Sulfur, wt. percent | 3.61 |
| Nitrogen, wt. percent | 0.150 |
| Boiling range, Engler, F. | 461–760 |

*Hydrofining.*—At 750° F., the total product recovered contained only 1.29% sulfur (64% desulfurization), less than 10% of which was gasoline. At this temperature, the flow rate of gas bubbles in the contacting zone below baffle 354 was calculated to be about 0.136 cubic feet per minute per square foot of contacting zone cross-section, and in the contacting zone above baffle 354, about 0.187 cubic feet per minute per square foot. The liquid product contained no detectable amount of catalyst although at least half of the total product was withdrawn as liquid, thus demonstrating that gas bubbles were almost completely excluded from the settling zone. At bubble flow rates above about 2 cubic feet per minute per square foot of cross-sectional area in the annulus surrounding cylindrical baffle 352, detectable amounts of catalyst begin to appear in the liquid product, indicating the entry of bubbles into the settling zone.

*Hydrocracking.*—At 825° F., the total liquid product recovered contained only 0.78% sulfur (78% desulfurization), and 50% by volume thereof was gasoline. At this temperature the flow rate of gas bubbles in the contacting zone below baffle 354 was calculated to be about 0.148 cubic feet per minute per square foot of contacting zone cross-section, and in the contacting zone above baffle 354, about 0.203 cubic feet per minute per square foot. Again, at least half of the total product was withdrawn as liquid, but no detectable amount of catalyst was found therein.

*Example II*

Another hydrofining run was carried out in the same apparatus, utilizing 50 grams of the same catalyst, and using as feed a diesel oil having the following characteristics:

| | |
|---|---|
| Gravity, ° API | 31.8 |
| Sulfur, wt. percent | 0.713 |
| Nitrogen, wt. percent | 0.052 |
| Boiling range, Engler, F. | 416–642 |

The contacting was carried out at 1,000 p.s.i.g., a hydrogen rate of 10,000 s.c.f. per barrel of feed, and at 16 liquid hourly space velocity (based on volume of dry catalyst).

At 700° F., the total product recovered was found to contain only 0.051% sulfur (93% desulfurization). At this temperature, the flow rate of gas bubbles in the contacting zone below baffle 354 was calculated to be about 0.324 cubic feet per minute per square foot of cross-section, and in the contacting zone above baffle 354, about 0.444 cubic feet per minute per square foot. Although at least half of the total product was withdrawn as liquid, no detectable amount of catalyst was found therein.

At 750° F., the total product recovered was found to contain only 0.024% sulfur (96.5% desulfurization). At this temperature, the flow rate of gas bubbles in the contacting zone below baffle 354 was calculated to be about 0.335 cubic feet per minute per square foot of cross-section, and in the contacting zone above baffle 354, about 0.459 cubic feet per minute per square foot. No detectable amount of catalyst was found in the liquid product.

As indicated, permissible bubble flow rates in the apparatus used in the above examples, are limited probably to a maximum of about 2 cubic feet per minute per square foot of cross-section at the level of baffle 354. However, by using apparatus such as that illustrated in FIGURES 1–7, with the slurry withdrawal aperture adjusted to a width of e.g., $\frac{1}{16}$ inch permissible bubble flow rates may range upwardly to about 10–20 cubic feet per minute per square foot of cross-section at the level of the aperture.

It is not intended that the invention should be restricted to the details disclosed in the examples or elsewhere, since many variations may be made by those skilled in the art without departing from the scope or spirit of the following claims, which are intended to define the true scope of the invention.

I claim:

1. A method for the treatment of a hydrocarbon oil with hydrogen and a hydrogenation catalyst, which comprises: (1) providing a slurry of said catalyst in said oil in a treatnig zone, said catalyst being in the form of particles of diameter between about 0.01 and 40 microns; (2) subjecting said slurry to treating conditions including temperatures above about 500° F. and hydrogen pressures above about 500 p.s.i.g.; (3) agitating said slurry and maintaining it saturated with hydrogen by continuously bubbling hydrogen gas through the slurry, thus forming an ebullient three-phase system; (4) withdrawing from a level beneath the surface of said ebullient system, through a laterally located aperture of maximum width between about $\frac{1}{1,000}$ and $\frac{1}{4}$ inch in a confining wall structure and in a direction transverse to the vertical axis of said system, a thin lamelliform stream of said slurry essentially free of gas bubbles; (5) flowing said withdrawn stream upwardly in a contiguous settling chamber communicating at its lower extremity with said aperture; (6) controlling the linear fluid flow rate upwardly in said settling chamber at a value substantially less than the linear fluid flow rate through said aperture and less than the settling velocity of said solid particles, whereby substantially all of the catalyst particles in said withdrawn slurry stream are permitted to settle and flow by gravity back through said aperture countercurrently to said withdrawn slurry stream; (7) controlling the flow rate of hydrogen bubbles through said slurry at a value between about 0.05 and 20 cubic feet per minute per square foot of horizontal cross-section at the level of said horizontal aperture; and (8) withdrawing substantially catalyst-free liquid product from an upper section of said settling chamber.

2. A process as defined in claim 1 wherein said hydrocarbon oil contains heavy aromatic materials boiling above about 700° F.

3. A method as defined in claim 1 wherein said treatment is a hydrofining operation carried out at between about 500°–850° F. and 50–5,000 p.s.i.g., in the presence of a hydrofining catalyst comprising a composite of an iron group metal sulfide and a Group VIB metal sulfide.

4. A method as defined in claim 1 wherein said treatment is a hydrocracking operation carried out at between about 400°–850° F. and 500–5,000 p.s.i.g., in the presence of a hydrocracking catalyst comprising (1) an acidic cracking base, and (2) a hydrogenating component selected from the class consisting of the Group VIB and Group VIII metals and their oxides and sulfides.

5. An apparatus for effecting intimate contacting of finely divided solids with a liquid and for removing solids-free liquid product from the contacting zone, comprising in combination (1) an elongated contacting column; (2) a fluid inlet conduit opening into said contacting column near one end thereof; (3) a concentric, inner settling tube open at its lower end supported within said outer vessel and extending a substantial longitudinal distance therein; (4) a baffle member supported within said contacting column and completely covering in horizontal projection the lower end of said settling tube, at least a peripheral portion of said baffle member being spaced a short distance, between about $\frac{1}{1,000}$ and $\frac{1}{4}$ inch below the lower end of said inner settling tube so as to provide a narrow, elongated aperture communicating between the interior of said settling tube and the interior of said contacting column, and (5) a fluid outlet conduit opening from the upper portion of said settling tube and traversing the walls of said outer contacting column.

6. An apparatus as defined in claim 5 wherein said baffle member is in the form of a cone of larger base diameter than said settling tube, supported upright and concentrically in said column with its apex extending a sufficient distance into the lower portion of said setting tube to define said aperture between the lower terminus of said settling tube and the sloping walls of said cone.

7. An apparatus for effecting intimate contacting of finely divided solids with a liquid in the presence of a bubbling gas phase, and for removing solids-free liquid product from the contacting zone comprising in combination (1) an elongated contacting column; (2) a longitudinal baffle member supported in said column and dividing the upper portion thereof into a settling chamber and a contiguous upper contacting chamber; (3) a transverse baffle member supported beneath said settling chamber and completely covering in horizontal projection the lower edge of said longitudinal baffle and traversing the lower edge of said longitudinal baffle a short distance, between about $\frac{1}{1,000}$ and $\frac{1}{4}$ inch, therebelow so as to provide an elongated aperture leading from said contacting chamber into said settling chamber, said transverse baffle member terminating within said contacting chamber a short distance beyond said longitudinal baffle; (4) an upturned lip attached to the contacting chamber terminus of said transverse baffle and extending upwardly a short distance beyond the lower terminus of said longitudinal baffle member; (5) a fluid inlet conduit opening into said contacting column near the bottom thereof; and (6) a fluid outlet conduit leading outwardly from the upper portion of said settling chamber.

8. An apparatus as defined in claim 7 wherein said transverse baffle member and said upturned lip comprise an integral structure, the baffle portion thereof sloping downwardly toward the lower terminus of said longitudinal baffle, and curving smoothly around said lower terminus and merging into said upturned lip.

9. An apparatus for effecting intimate contacting of finely divided solids with a liquid and for removing solids-free liquid product from the contacting zone, comprising in combination (1) an elongated contacting column open at its lower end; (2) a closed settling chamber coaxially surrounding the lower portion of said contacting column, the lower portion of said settling chamber being conical in shape; the lower end of said contacting column terminating at a horizontal plane a short distance above the inner surface of the conical bottom portion of said settling chamber so as to provide an annular aperture of about $\frac{1}{1,000}$ to $\frac{1}{4}$ inch width communicating between the interior of said contacting column and the annular space included between the walls of said settling chamber and the lower portion of said contacting column; (3) a fluid inlet conduit leading coaxially into the bottom of said settling chamber; (4) a first fluid outlet conduit leading out from the upper portion of said settling chamber; (5) a liquid level-controlled valve in said first fluid outlet conduit responsive to means for detecting liquid level in said contacting column; (6) a second fluid outlet conduit leading out from the upper portion of said contacting column; (7) a back-pressure-regulated valve in said second fluid outlet conduit responsive to means for detecting pressure at the top of said contacting column; and (8) a feed inlet conduit leading into said contacting column at a level between said first and second fluid outlet conduits.

References Cited in the file of this patent

UNITED STATES PATENTS

| 2,583,110 | MacLean | Jan. 22, 1952 |
| 2,750,266 | Roberts et al. | June 12, 1956 |
| 2,847,284 | Busey | Aug. 12, 1958 |
| 2,868,627 | Kolbel et al. | Jan. 13, 1959 |
| 2,871,108 | Knapp | Jan. 27, 1959 |
| 2,944,961 | McAfee | July 12, 1960 |
| 2,989,382 | Voorhies et al. | June 20, 1961 |
| 3,003,580 | Lanning | Oct. 10, 1961 |